(12) United States Patent
Goldstein et al.

(10) Patent No.: US 6,337,859 B1
(45) Date of Patent: *Jan. 8, 2002

(54) NON-BLOCKING CROSSCONNECT APPARATUS

(75) Inventors: Evan Lee Goldstein, Princeton; Lih-Yuan Lin, Middletown; Adel Abdel Moneim Saleh, Holmdel; Jane Marie Simmons, Eatontown, all of NJ (US)

(73) Assignee: At&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,241

(22) Filed: Dec. 31, 1997

(51) Int. Cl.[7] .................................................. H04Q 1/16
(52) U.S. Cl. ....................................... 370/361; 340/2.25
(58) Field of Search ................................. 370/361, 359, 370/380, 388, 395, 360; 340/825.8, 825.79, 826, 2.25, 2.21, 2.27, 2.6

(56) References Cited

U.S. PATENT DOCUMENTS

| | | | | |
|---|---|---|---|---|
| 3,760,103 A | * | 9/1973 | Condon | 370/359 |
| 4,635,250 A | * | 1/1987 | Georgiou | 370/380 |
| 5,010,545 A | * | 4/1991 | Jacob | 370/388 |
| 5,325,089 A | * | 6/1994 | Goeldner | 340/825.8 |
| 5,430,722 A | * | 7/1995 | Jacob | 370/395 |

OTHER PUBLICATIONS

Hiroshi Toshiyoshi and Hiroyuki Fujita, "Electrostatic Micro Trosion Mirrors for an Optical Switch Matrix", Journal of Microelectromechanical Systems, vol. 5, No. 4, Dec., 1996, pp. 231–237.

* cited by examiner

Primary Examiner—Edwin C. Holloway, III
(74) Attorney, Agent, or Firm—Oliff & Berridge, PLC

(57) ABSTRACT

A non-blocking crossconnect apparatus includes a primary bi-directional crossconnect device and a plurality of secondary bi-directional crossconnect devices. The primary crossconnect device has a plurality of pairs of bi-directional signal ports. A first one of each of the plurality of pairs of the bi-directional signal ports are arranged in a first set and a corresponding second one of each of the plurality of pairs of the bi-directional signal ports are arranged in a second set. Each secondary crossconnect device is associated with a respective one of the plurality of pairs of bi-directional signal ports and has a pair of secondary bi-directional signal ports and a pair of bi-directional signal leads. A first one of each pair of the bi-directional signal leads is operably connected to a respective one of the bi-directional signal ports in the first set and a second one of each pair of the bi-directional signal leads is operably connected to a respective one of the bi-directional signal ports in the second set. By utilizing symmetry and the bi-directional nature of communication lines, the present invention yields a rearrangeably non-blocking crossconnect apparatus as well as a strictly non-blocking crossconnect apparatus.

8 Claims, 5 Drawing Sheets

NON-BLOCKING CROSSCONNECT APPARATUS

BACKGROUND OF THE INVENTION

1. Field of Invention

The present invention is directed to a crossconnect apparatus that is used at a switching station in communications networks. More particularly, the present invention relates to a non-blocking crossconnect apparatus used in communications networks.

2. Description of Related Art

Telecommunications companies have constructed communication networks throughout the world to satisfy the ever increasing demand for communications. Some of these communication networks are fabricated from copper wire while others are fabricated from fiber optic cables. For proper provisioning of the communications network, switching stations are used for routing purposes.

As the demand for communications increases, larger crossconnects are required at the switching stations to meet the demand. Rather than building larger and larger crossconnects to meet the demand for communications, commonly-used design techniques for building crossconnects that are fabricated from multiple smaller components yet provide the desired switching pattern are available.

One such crossconnect is a three-stage Benes crossconnect 2 as shown in FIG. 1. The three-stage Benes crossconnect 2 is considered a fully-connected, rearrangeably, non-blocking architecture. The architecture is rearrangeably non-blocking because any connection can be added to the crossconnect but it may require rearranging one or more of the connections that are already established. The three-stage Benes crossconnect includes two N/2×N/2 crossconnects with N 2×2 crossconnects. In this example of a three-stage Benes crossconnect, N is equal to 8.

Respective ones of the outputs "$\sigma_1$" from four 2×2 crossconnects in stage 1 are inputted into respective ones of the two N/2×N/2 crossconnects in stage 2. Respective ones of the outputs "$\sigma_2$" from the two N/2×N/2 crossconnects in stage 2 are inputted into respective ones of the remaining four 2×2 crossconnects in stage 3.

Another type of crossconnect which is used to reduce the complexity of a switching matrix is a three-stage Clos crossconnect 4 as shown in FIG. 2. The three-stage Clos crossconnect 4 is a fully-connected, strictly non-blocking architecture. A strictly non-blocking architecture means that any connection can be added without disturbing any of the other connections already established. The three-stage Clos crossconnect 4 includes four 2×3 crossconnects in stage 1 connected to three N/2×N/2 crossconnects in stage 2 which, in turn, are connected to four 3×2 crossconnects in stage 3. For this example in FIG. 2, N is equal to 8. A respective one of the three outputs "$\sigma_4$" of the 2×3 crossconnects in stage 1 are connected to respective inputs of each of the three N/2×N/2 crossconnects in stage 2. Respective ones of the outputs "$\sigma_5$" of the three N/ 2×N/2 crossconnects in stage 2 is connected to respective inputs of each 3×2 crossconnects in stage 3.

Even though the Benes and Clos crossconnects are commonly used to reduce the complexity of the switch matrix, there continues to be a problem in that these popular crossconnects require an unnecessary number of crossconnect components.

SUMMARY OF THE INVENTION

The crossconnect apparatuses of the present invention employ the concept of the symmetry to further reduce the number of crossconnect components needed to construct a rearrangeably non-blocking crossconnect apparatus or a strictly non-blocking crossconnect apparatus. Communications networks are typically inherently symmetrical because when party A communicates with party B, party B, in turn, communicates with party A. Thus, symmetry is achieved when A goes to B and, in turn, B goes to A. Additionally, the non-blocking crossconnect apparatuses of the present invention include bi-directional signal ports and bi-directional signal leads that facilitate crossconnect apparatuses that yield the desired results of the Benes and Clos crossconnects but with less crossconnect components.

A first exemplary embodiment of a rearrangeably non-blocking crossconnect apparatus of the present invention includes a primary bi-directional crossconnect device and a plurality of secondary bi-directional crossconnect devices. The primary crossconnect device has N/2 pairs of bi-directional signal ports where N is an even integer greater than 1. A first one of each of the N/2 pairs of bi-directional signal ports is arranged in a first set and a corresponding second one of each of the N/2 pairs of the bi-directional signal ports is arranged in a second set. Each secondary crossconnect device is associated with a respective one of the N/2 pairs of bi-directional signal ports and has a pair of secondary bi-directional signal ports and a pair of bi-directional signal leads. A first one of each pair of bi-directional signal leads is operably connected to a respective one of the bi-directional signal ports in the first set of the primary crossconnect device and a second one of each pair of the bi-directional signal leads is operably connected to a respective one of the bi-directional signal ports in the second set of the primary crossconnect device.

A second embodiment of a non-blocking crossconnect apparatus of the present invention includes a first primary bi-directional crossconnect device, a second primary bi-directional crossconnect device and N/2 secondary bi-directional crossconnect devices. Each of the first and second bi-directional primary crossconnect devices has N/2 pairs of bi-directional ports where N is an even integer greater than 1. A first one of each of the N/2 pairs of bi-directional signal ports is arranged in a first set and a corresponding second one of each of the N/2 pairs of bi-directional signal ports is arranged in a second set. Each secondary crossconnect device has a pair of secondary bi-directional signal ports arranged in a first group and four bi-directional signal leads arranged in a second group. A first bi-directional signal lead and a second bi-directional signal lead of each of the N/2 secondary crossconnect devices are operably connected to respective ones of the bi-directional signal ports in the first and second sets respectively of the first primary crossconnect device. A third bi-directional signal lead and a fourth bi-directional signal lead of each of the N/2 secondary cross connect devices are operably connected to respective ones of the bi-directional signal ports in the first and second sets respectively of the second primary crossconnect device.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 3:
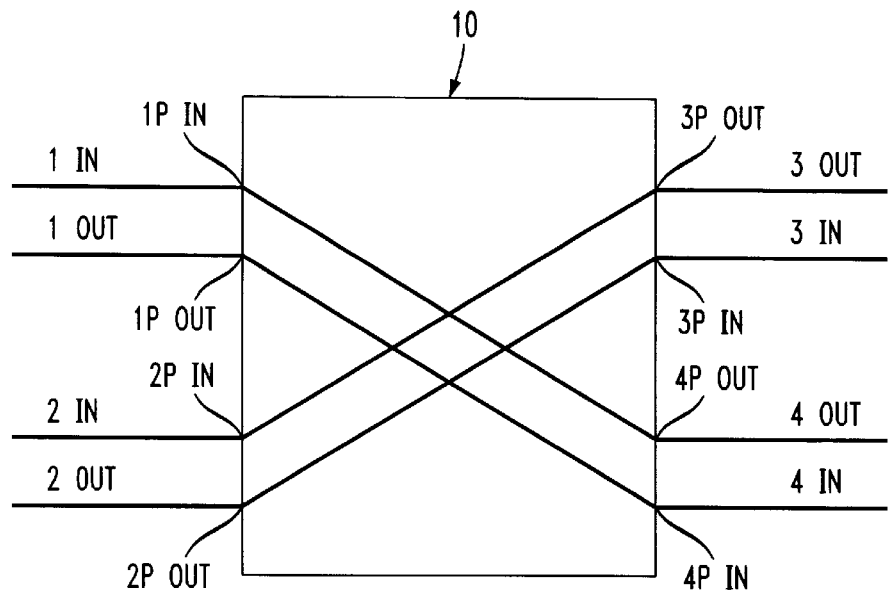
FIG. 3 is a block diagram illustrating bi-directional signal leads and bi-directional signal ports of a 2×2 crossconnect that is incorporated in the present invention.

The present invention is a non-blocking crossconnect apparatus that incorporates the features of symmetry and bi-directional signal ports or leads. By way of example, a 2×2 bi-directional crossconnect device 10 is introduced in FIGS. 3 and 4. In FIG. 3, four bi-directional leads are shown as 1in and 1out, 2in and 2out, 3in and 3out and 4in and 4out and, correspondingly, four bi-directional signal ports are shown as 1Pin 1Pout, 2Pin 2Pout, 3Pin 3Pout and 4Pin 4Pout.

The feature of symmetry is indicated by the connections made by the crossconnect device 10. To wit, 1in is crossconnected to 4out and, because of symmetry, 4in must be connected to 1out. Likewise, 2in is connected to 3out and, because of symmetry, 3in must be connected to 2out. Thus, the 2×2 bi-directional crossconnect device 10 is symmetrical.

Figure 4:
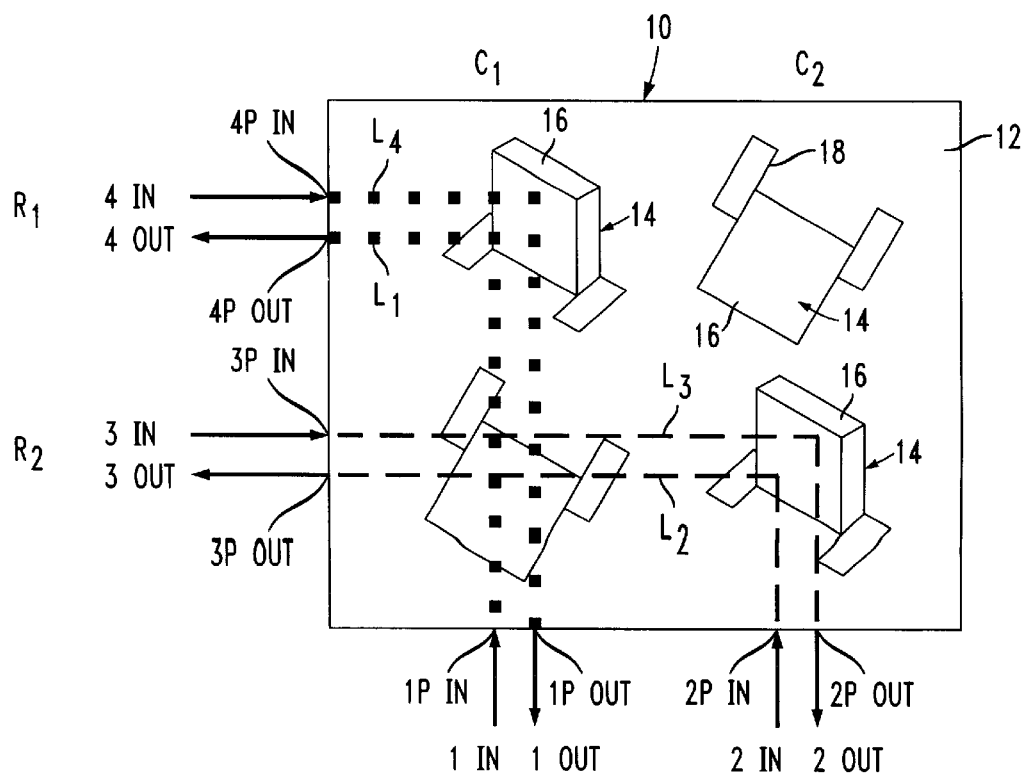
FIG. 4 is a schematic view of a 2×2 crossconnect incorporating the bi-directional features in FIG. 3.

As illustrated in FIG. 4, the 2×2 crossconnect device 10 incorporating the bi-directional and symmetrical features includes a base member 12 and a plurality of optical switch devices 14. The crossconnect device 10 shown in FIG. 4 is illustrated by way of example only by using optics because most modern ground-based communication networks use fiber optic cables. One of ordinary skill in the art would appreciate that implementing the non-blocking crossconnect apparatus of the present invention could be used with any type of crossconnect devices such as mechanical crossconnect devices, electrical crossconnect devices and optical crossconnect devices and other such crossconnect devices used at switching stations of communications networks.

The optical switch device 14 includes a reflective element 16 that moves between a reflective state and a nonreflective state and an actuator that causes the reflective element 16 to move between the reflective state and the nonreflective state.

The bi-directional signal lead 1in and 1out is connected to the crossconnect device 10 at the bi-directional signal port 1Pin and 1Pout. A light beam L1 is emitted from a bi-directional signal port portion 1Pin and is reflected from the reflective element 16 located in row R1, column C1 and disposed in the reflective state. The light beam L1 is reflected from the reflective element 16 and redirected to a bi-directional port portion 4Pout which, in turn, is connected to a bi-directional signal lead portion 4out. Additionally, a light beam L4 is emitted from a bi-directional signal port portion 4Pin and is reflected from the same reflective element 16 as light beam L1 and is redirected to a bi-directional signal port portion 1Pout which, in turn, is connected to a bi-directional signal lead portion 1out.

Additionally, a light beam L2 which is emitted from a bi-directional signal port portion 2Pin is reflected from the reflective element 16 located in column C2 and row R2 and disposed in the reflective state so that the light beam L2 is redirected to a bi-directional signal port portion 3Pout which, in turn is connected to a bi-directional lead line portion 3out. Correspondingly, a light beam L3 emitted from a bi-directional signal port portion 3Pin is reflected from the same reflective element as the light beam L2 and is redirected to a bi-directional signal port portion 2Pout which, in turn, is connected to a bi-directional signal line portion 2out.

Figure 5:
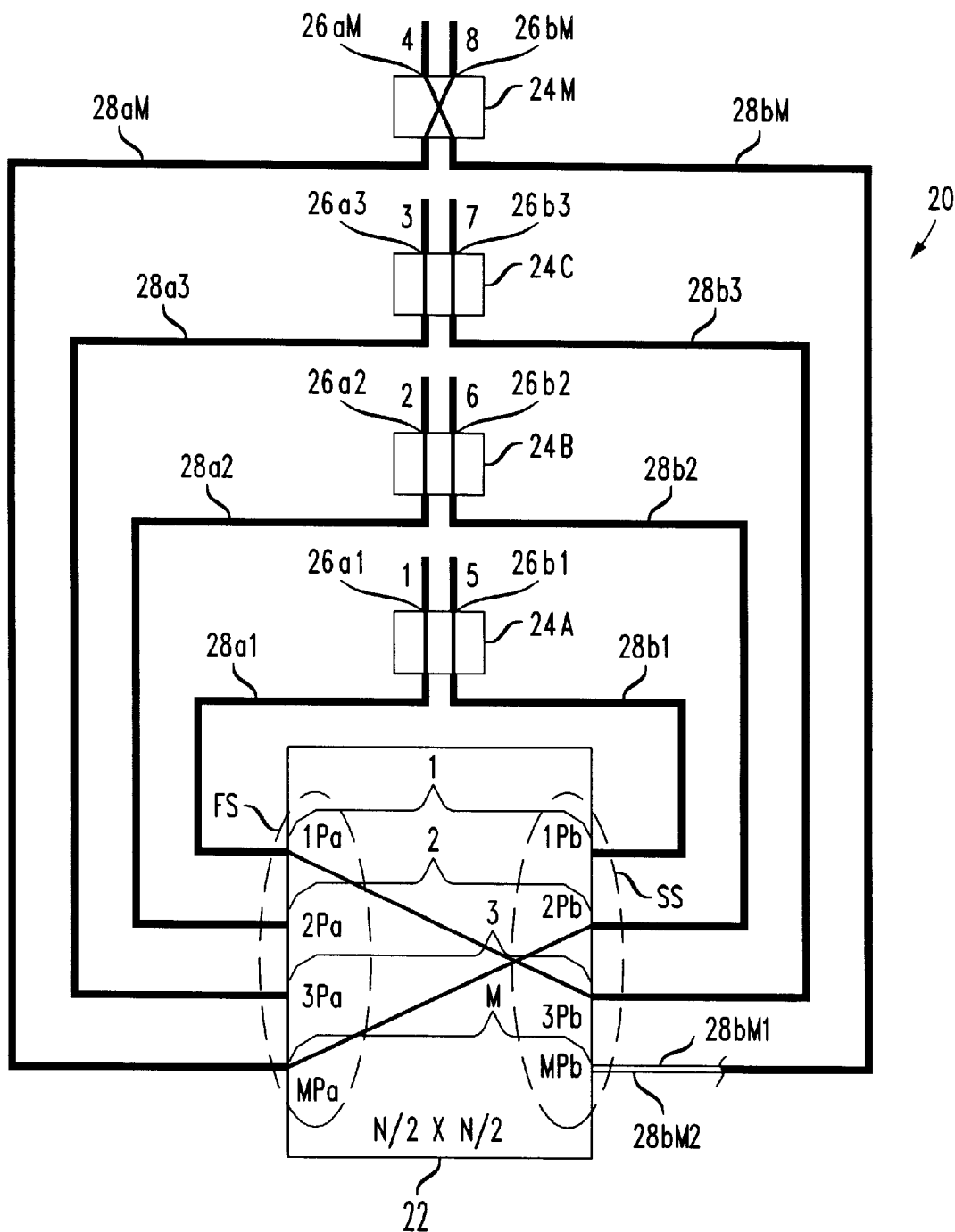
FIG. 5 is a schematic view of a first embodiment of a non-blocking crossconnect apparatus of the present invention.

A first exemplary embodiment of a non-blocking crossconnect apparatus 20 of the present invention is introduced in FIG. 5. The non-blocking crossconnect apparatus 20 includes a primary bi-directional crossconnect device 22 and a plurality of secondary bi-directional crossconnect devices 24A–24M. The primary crossconnect device 22 is an N/2× N/2 crossconnect device where N is an even integer greater than 1. The primary crossconnect device 22 has N/2 pairs of bi-directional signal ports, 1Pa–1Pb through MPa–MPb where M=N/2. As defined above, the signal port 1Pa, for example, would include both 1Pin and 1Pout. This principle applies to all of the bi-directional signal ports. A first one, 1Pa–MPa, of each of the N/2 pairs of bi-directional signal ports 1Pa–1Pb through MPa–MPb is arranged in a first set FS. A corresponding second one, 1Pb–MPb, of each of the N/2 pairs of the bi-directional signal ports 1Pa–1Pb through MPa–MPb is arranged in a second set SS.

As shown in FIG. 5, each of the secondary crossconnect devices 24A–24M is associated with a respective one of the N/2 pairs of the bi-directional signal ports 1Pa–1Pb through MPa–MPb. Further, each secondary crossconnect device 24A–24M has a pair of secondary bi-directional signal ports 26a1 and 26b1 through 26aM and 26bM . Also, each secondary crossconnect device 24A–24M has a pair of bi-directional signal leads 28a1 and 28b1 through 28aM and 28bM. Each bi-directional signal lead includes two lead elements such as 28bM1 and 28bM2 as shown in FIG. 5 As noted above, each bi-directional signal lead includes a lead line in and a lead line out. Each of the bi-directional signal leads 28a1–28aM, which is a respective one of each pair of the bi-directional signal leads 28a1–28b1 through 28aM–28bM, is operably connected to a respective one of the bi-directional signal ports 1Pa–MPa in the first set FS of the primary crossconnect device 22. Each of the bi-directional signal leads 28b1–28bM, which is a respective remaining one of the pair of the bi-directional signal leads 28a1–28b1 through 28aM–28bM, is operably connected to a respective one of the bi-directional signal ports 1Pb–MPb in the second set SS of the primary crossconnect device 22.

The first set FS of the bi-directional signal ports 1Pa–MPa and the second set SS of the bi-directional signal ports 1Pb–MPb are operative to communicate with each other as illustrated by the crisscrossing lines inside of the primary crosssconnect device 22. However, individual ones of the bi-directional signal ports 1Pa–MPa of the first set FS of the primary crossconnect device 22 are incapable of communicating with each other. Similarly, individual ones of the bi-directional signal ports 1Pb–MPb in the second set SS of the primary crossconnect device 22 are also incapable of communicating with each other.

Each pair of bi-directional secondary signal ports 26a1–26b1 through 26aM–26bM and each pair of bi-directional signal leads 28a1–28b1 through 28aM–28bM of each respective secondary crossconnect device 24A–24M are operative to communicate with each other as illustrated by the lines inside of each secondary crossconnect device 24A–24M. However, individual ones of each respective pair of the bi-directional secondary signal ports 26a1–26b1 through 26aM–26bM are incapable of communicating with each other as illustrated by the lines inside of each secondary crossconnect device 24A–24M. Similarly, individual ones of each respective pair of the bi-directional signal leads 28a1–28b1 through 28aM–28bM are also incapable of communicating with each other.

One of ordinary skill in the art would appreciate that the crossconnect apparatus 20 of the present invention illustrated in FIG. 5 is a rearrangeably non-blocking crossconnect apparatus. By way of example only illustrated in FIG. 5, the secondary bi-directional signal port 26a1 is connected to secondary bi-directional signal port 26b3 and the secondary bi-directional signal port 26b2 is connected to the secondary bi-directional signal port 26bM.

Figure 1:
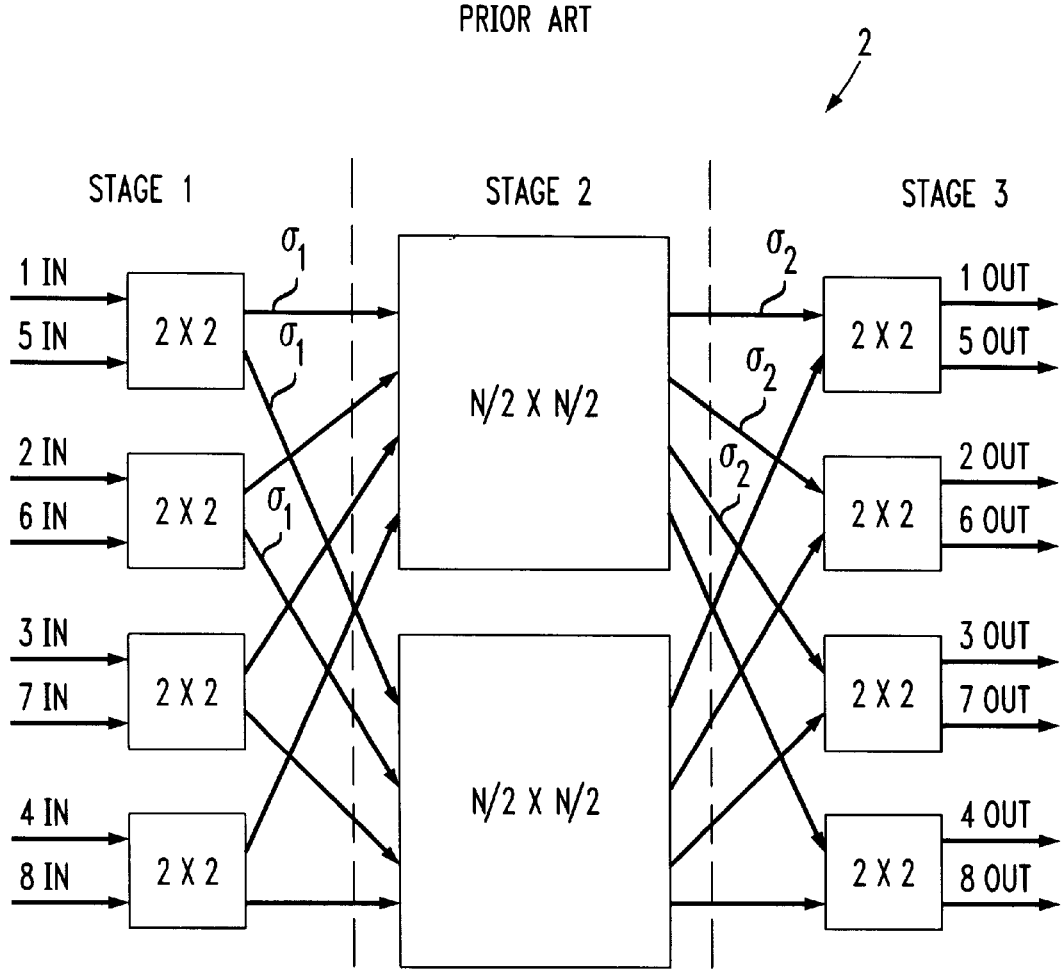
FIG. 1 is a block diagram of a conventional three-stage Benes crossconnect wherein N is equal to 8.

By comparison, the rearrangeably non-blocking crossconnect apparatus 20 of the present invention performs similarly to the three-stage Benes crossconnect apparatus in FIG. 1. However, the three-stage Benes crossconnect requires N 2×2 crossconnects and two N/2×N/2 crossconnects while the rearrangeably non-blocking crossconnect apparatus 20 of the present invention requires only one N/2×N/2 bi-directional crossconnects and N/2 2×2 bi-directional crossconnects. Thus, the present invention, although not fully connected, can make all desirable connections with only one-half of the crossconnect components of the three-stage Benes crossconnect.

Figure 6:
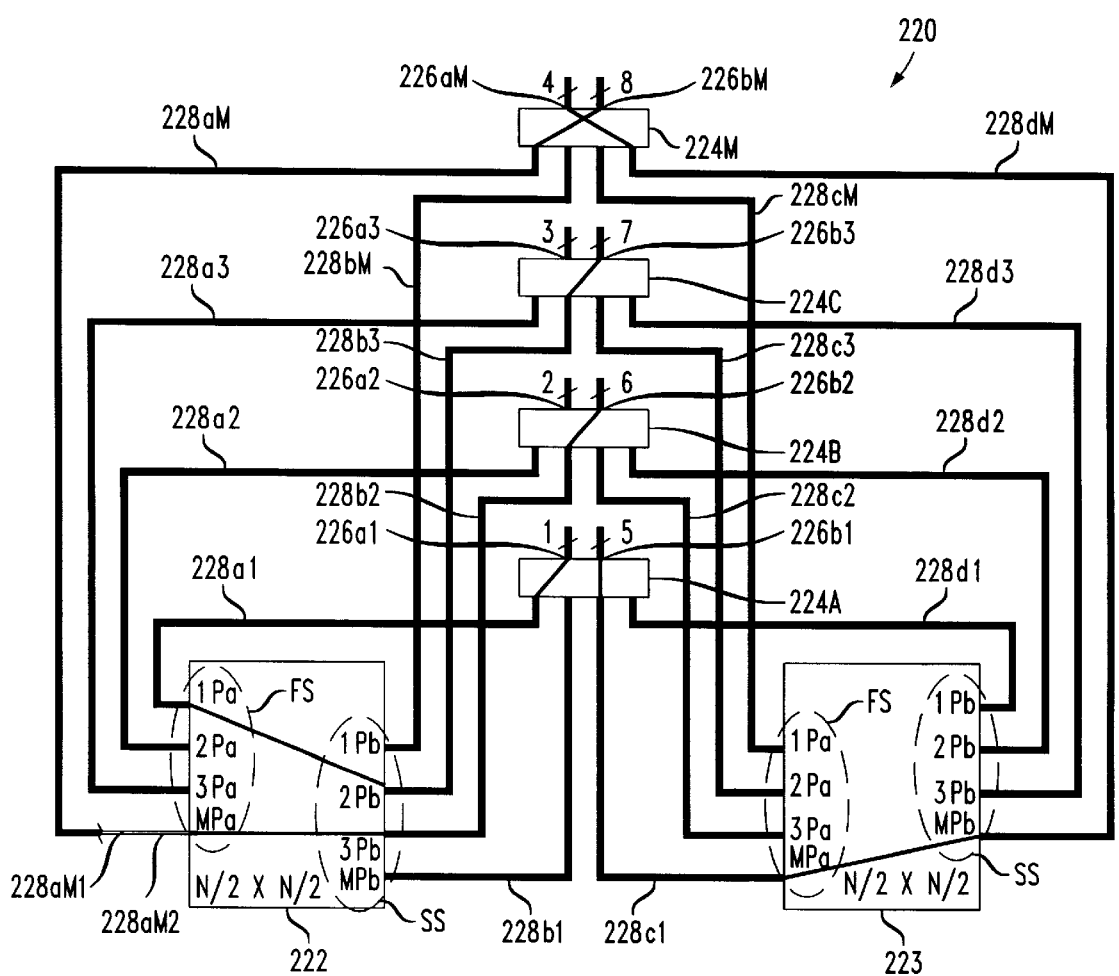
FIG. 6 is a diagrammatic view of a second embodiment of the non-blocking crossconnect apparatus of the present invention.

A second embodiment of a non-blocking crossconnect apparatus 220 is introduced in FIG. 6. The non-blocking crossconnect apparatus 220 of the present invention includes a first primary bi-directional crossconnect device 222, a second primary bi-directional crossconnect device 223 and a plurality of secondary bi-directional crossconnect devices 224A–224M. Both the first and second primary bi-directional crossconnect devices are N/2×N/2 crossconnect devices wherein N is an even integer greater than 1. Each of the first and second primary crossconnect devices 222 and 223 has N/2 pairs of bi-directional signal ports 1Pa–1Pb through MPa–MPb where M=N/2. A first one, i.e. 1Pa–MPa, of each of the N/2 pairs of bi-directional signal ports 1Pa–1Pb through MPa–MPb is arranged in a first set FS in each of the first primary crossconnect device 222 and the second primary crossconnect device 223. A corresponding second one, i.e. 1Pb–MPb, of each of the N/2 pairs of bi-directional signal ports 1Pa–1Pb through MPa–MPb is arranged in a second set SS.

The plurality of secondary crossconnect devices 224A–224M is equal to N/2. Each secondary crossconnect device 224A–224M has a pair of secondary bi-directional signal ports 226a1–226b1 through 226aM–226bM and four bi-directional signal leads 228a1–228d through 228aM–228dM. Each bi-directional signal lead includes two lead elements such as 28aM1 and 28aM2 as shown in FIG. 6. A first bi-directional signal lead 228a and a second bi-directional signal lead 228b of each secondary crossconnect device 224A–224M are operably connected to respective ones of the bi-directional signal ports 1Pa–1Pb through MPa–MPb in the first set FS and second set SS respectively of the first primary crossconnect device 222. A third bi-directional signal lead 228c and a fourth bi-directional lead 228d of each secondary crossconnect device 224A–224M are operably connected to respective ones of the bi-directional signal ports 1Pa–1Pb through Mpa–MPb in the first set FS and the second set SS respectively of the second primary crossconnect device 223.

Similar to the first embodiment of the non-blocking crossconnect apparatus 20 of the present invention, the first set FS of the bi-directional signal ports and the second set SS of the bi-directional signal ports of respective ones of the first and second primary crossconnect devices 222 and 223 are operative to communicate with each other. However, individual ones of the bi-directional signal ports in respective ones of the first set FS and the second set SS of each of the first and second primary crossconnect devices 222 and 223 are incapable of communicating with each other. Also, the secondary bi-directional signal ports 226a1–226b1 through 226aM–226bM and the bi-directional signal leads 228a1–228b1 through 228aM–228dM of respective ones of the secondary crossconnect devices 224a–224M are operative to communicate with each other. Additionally, individual ones of the secondary bi-directional signal ports 226a1–226b1 through 226aM–226bM of each secondary crossconnect device 224a–224M are incapable of communicating with each other and individual ones of the bi-directional signal leads 228a1–228d1 through 228aM–228dM of respective ones of the secondary crossconnect devices 224A–224M are also incapable of communicating with each other.

The crossconnect apparatus 220 of the present invention is considered a strictly non-blocking crossconnect device. By way of example in FIG. 6, the secondary bi-directional signal port 226a1 is connected to the secondary bi-directional signal port 226b3 and the secondary bi-directional signal port 226b2 is connected to the secondary bidirectional signal port 226bM.

Figure 2:
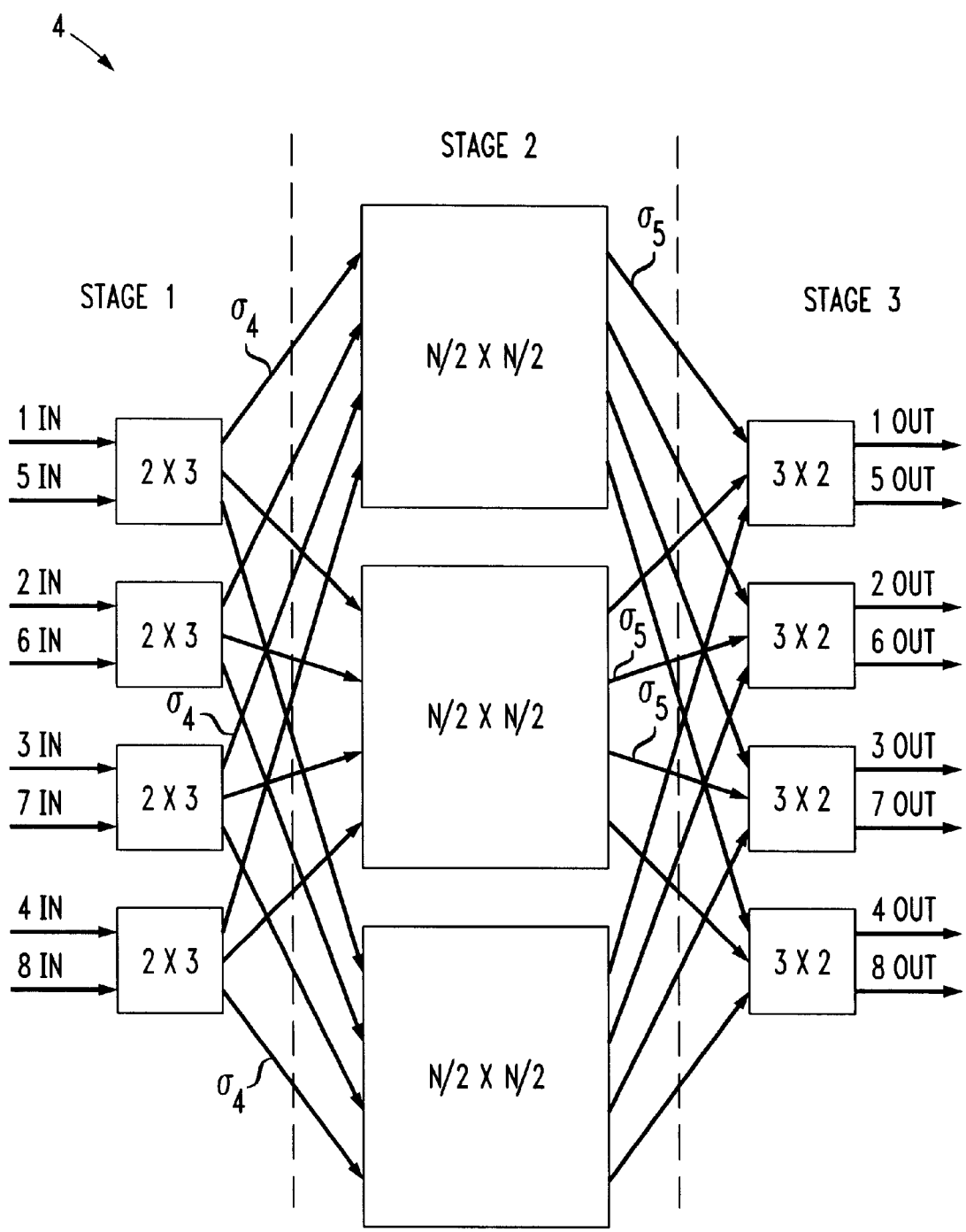
FIG. 2 is a block diagram of a conventional three-stage Clos crossconnect device wherein N is equal to 8.

By comparison, the non-blocking crossconnect apparatus 220 performs similarly as the three-stage Clos crossconnect as shown in FIG. 2. The three-stage Clos crossconnect requires N 2×3 crossconnects and three N/2×N/2 crossconnects while the non-blocking crossconnect apparatus 220 of the present invention requires only N/2 2×4 bi-directional crossconnects and two N/2×N/2 bi-directional crossconnects. Thus, although not fully connected, the non-blocking crossconnect apparatus 220 of the present invention achieves all desirable connections of the three-stage Clos crossconnect while using less crossconnect components.

Although not by way of limitation, an exemplary embodiment of the present invention can incorporate an optical switch device or optical switch devices as described in a co-pending patent application filed concurrently with the present application, entitled "Fiber-Optic Free-Space Micromachined Matrix Switches" and identified under attorney docket number JAO 37661.

The present invention has been described with particularity in connection with the exemplary embodiments. However, it should be appreciated that changes may be made to the disclosed embodiments of the invention without departing from the spirit and inventive concepts defined in the following claims.

What is claimed is:

1. A rearrangeably non-blocking crossconnect apparatus, comprising:

a primary crossconnect device having N/2 pairs of bi-directional signal ports, a first one of each of the N/2 pairs of bi-directional signal ports arranged in a first set and a corresponding second one of each of the N/2 pairs of the bi-directional signal ports arranged in a second set wherein N is an even integer greater than 1; and a plurality of secondary crossconnect devices, each secondary crossconnect device associated with a respective one of the N/2 pairs of bi-directional signal ports and having a pair of secondary bi-directional signal ports and a pair of bi-directional signal leads, a first one of each pair of bi-directional signal leads operably connected to a respective one of the bi-directional signal ports in the first set and a second one of each pair of the bi-directional signal leads operably connected to a respective one of the bi-directional signal ports in the second set.

2. A rearrangeably non-blocking crossconnect apparatus according to claim 1, wherein the primary crossconnect device and the plurality of secondary crossconnect devices are selected from a group consisting of mechanical crossconnect devices, electrical crossconnect devices and optical crossconnect devices.

3. A rearrangeably non-blocking crossconnect apparatus according to claim 1, wherein the first set of bi-directional signal ports and the second set of bi-directional signal ports are operative to communicate with each other while individual ones of the bi-directional signal ports in respective ones of the first and second sets are incapable of communicating with each other.

4. A rearrangeably non-blocking crossconnect apparatus according to claim 1, wherein each respective pair of bi-directional secondary signal ports and bi-directional signal leads are operative to communicate with each other while individual ones of each respective pair of the bi-directional secondary signal ports are incapable of communicating with each other and individual ones of each respective pair of bi-directional signal leads are incapable of communicating with each other.

5. A strictly non-blocking crossconnect apparatus, comprising:

a first primary crossconnect device and a second primary crossconnect device, each of the first and second primary crossconnect devices having N/2 pairs of bi-directional signal ports with a first one of each of the N/2 pairs of bi-directional signal ports arranged in a first set and a corresponding second one of each of the N/2 pairs of bi-directional signal ports arranged in a second set wherein N is an even integer greater than 1;and N/2 secondary crossconnect devices, each secondary crossconnect device having a pair of secondary bi-directional signal ports and four bi-directional signal leads whereby a first bi-directional signal lead and a second bi-directional signal lead of each secondary crossconnect device are operably connected to respective ones of the bi-directional signal ports in the first and second sets respectively of the first primary crossconnect device and a third bi-directional signal lead and a fourth bi-directional signal lead of each secondary crossconnect device are operably connected to respective ones of the bi-directional signal ports in the first and second sets respectively of the second primary crossconnect device.

6. A strictly non-blocking crossconnect apparatus according to claim 5, wherein the first primary crossconnect device, the second primary crossconnect device and the N/2 secondary crossconnect devices are selected from a group consisting of mechanical crossconnect devices, electrical crossconnect devices and optical crossconnect devices.

7. A rearrangeably non-blocking crossconnect apparatus according to claim 5, wherein the first set of bi-directional signal ports and the second set of bi-directional signal ports of respective ones of the first and second primary crossconnect devices are operative to communicate with each other while individual ones of the bi-directional signal ports in respective ones of the first and second sets of each first and second primary crossconnect device are incapable of communicating with each other.

8. A rearrangeably non-blocking crossconnect apparatus according to claim 7, wherein the secondary bi-directional signal ports and the bi-directional signal leads of respective ones of the secondary crossconnect devices are operative to communicate with each other while individual ones of the secondary bi-directional signal ports of each respective secondary crossconnect device are incapable of communicating with each other and individual ones of the bi-directional signal leads of respective ones of the secondary crossconnect devices are incapable of communicating with each other.

* * * * *